United States Patent [19]

Hashimoto et al.

[11] 4,429,334

[45] Jan. 31, 1984

[54] METHOD FOR RECORDING AND REPRODUCING A DIGITAL COLOR VIDEO SIGNAL

[75] Inventors: Yoshitaka Hashimoto, Chofu; Norihisa Shirota, Atsugi; Kaichi Yamamoto, Zama, all of Japan

[73] Assignee: Sony Corporation, Tokyo, Japan

[21] Appl. No.: 194,830

[22] Filed: Oct. 7, 1980

[30] Foreign Application Priority Data

Oct. 12, 1979 [JP] Japan .................................. 54-132170
Oct. 16, 1979 [JP] Japan .................................. 54-133313

[51] Int. Cl.³ .............................................. H04N 5/91
[52] U.S. Cl. ...................................... 358/310; 358/31
[58] Field of Search ................. 358/4, 13, 138, 31, 358/8, 310, 320, 324; 360/32, 22, 9, 38, 72.2, 10, 48, 9.1, 10.1, 10.3, 38.1

[56] References Cited

U.S. PATENT DOCUMENTS

| | | | |
|---|---|---|---|
| 3,761,611 | 9/1973 | Nakamura | 360/72.2 |
| 3,836,707 | 9/1974 | Murakami | 358/31 |
| 3,921,204 | 11/1975 | Thompson | 358/13 |
| 3,922,669 | 11/1975 | Baldwin | 360/33 |
| 4,084,181 | 4/1978 | Mita | 358/4 |
| 4,277,807 | 7/1981 | Baldwin | 360/32 |
| 4,329,708 | 5/1982 | Yamamoto | 358/310 |

*Primary Examiner*—Alan Faber
*Attorney, Agent, or Firm*—Lewis H. Eslinger; Alvin Sinderbrand

[57] ABSTRACT

A method for recording a color video signal in a plurality of parallel tracks extending obliquely on a magnetic tape includes the steps of sampling the video signal at a frequency which is at least three times the color sub-carrier frequency of the color video signal, converting the sampled video signal into digital form, and recording respective pluralities of the digitized samples which are arranged in a predetermined sequence sequentially in the plurality of parallel tracks, by either recording respective pluralities of contiguous digitized samples sequentially in the tracks, in which each plurality corresponds to at least one cycle of the color sub-carrier, or by alternately separating contiguous ones of the digitized samples into first and second blocks and recording respective pluralities of successive digitized samples of the first and second blocks sequentially in the tracks with the sampling frequency being equal to four times the color sub-carrier frequency, such that the chrominance component of the digital color video signal can be separated during reproduction so as to correct any error in the phase of the color sub-carrier, and such that with the first embodiment of the last-mentioned step, a digital filter having a chrominance characteristic $C=(1-Z^{-2})/2$ can be used, and with the method according to the second embodiment, a fourth order digital filter having a chrominance characteristic $C=(-1=2Z^{-2}-Z^{-4})/2$ can be used to reproduce the chrominance component, where Z is a delay transfer characteristic of the respective filters.

12 Claims, 30 Drawing Figures

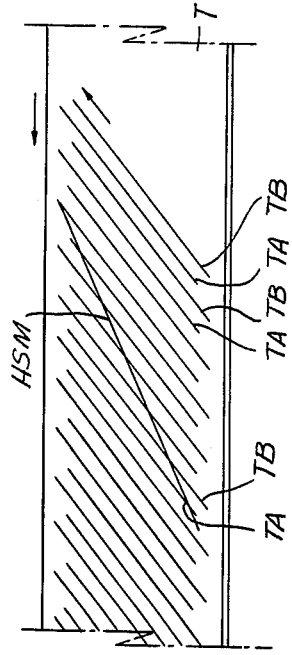
FIG.5
FIG.4
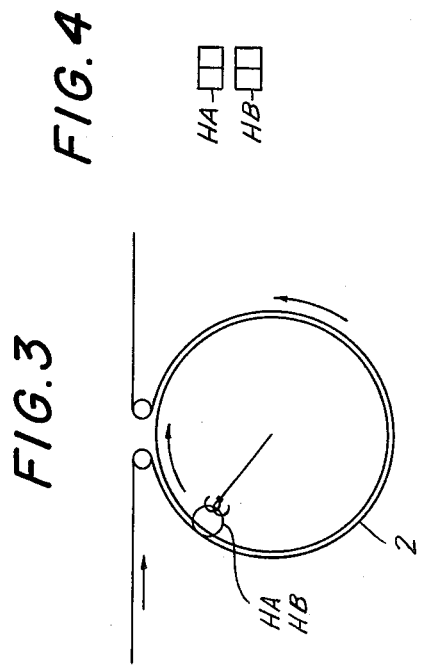
FIG.3
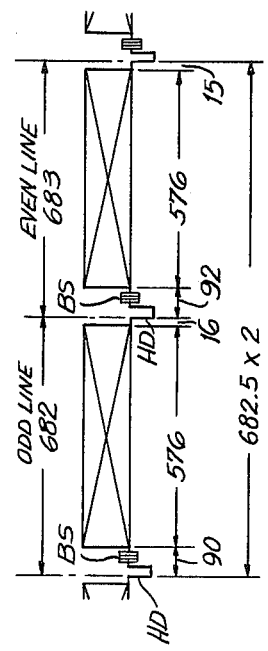
FIG.6

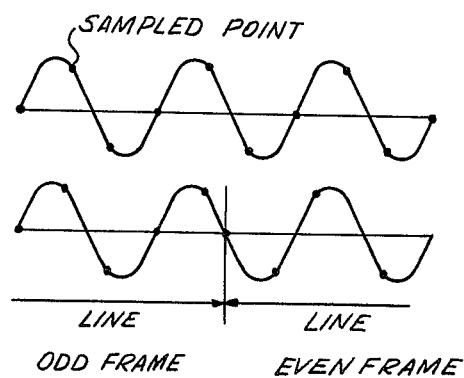
FIG.16A
FIG.16B
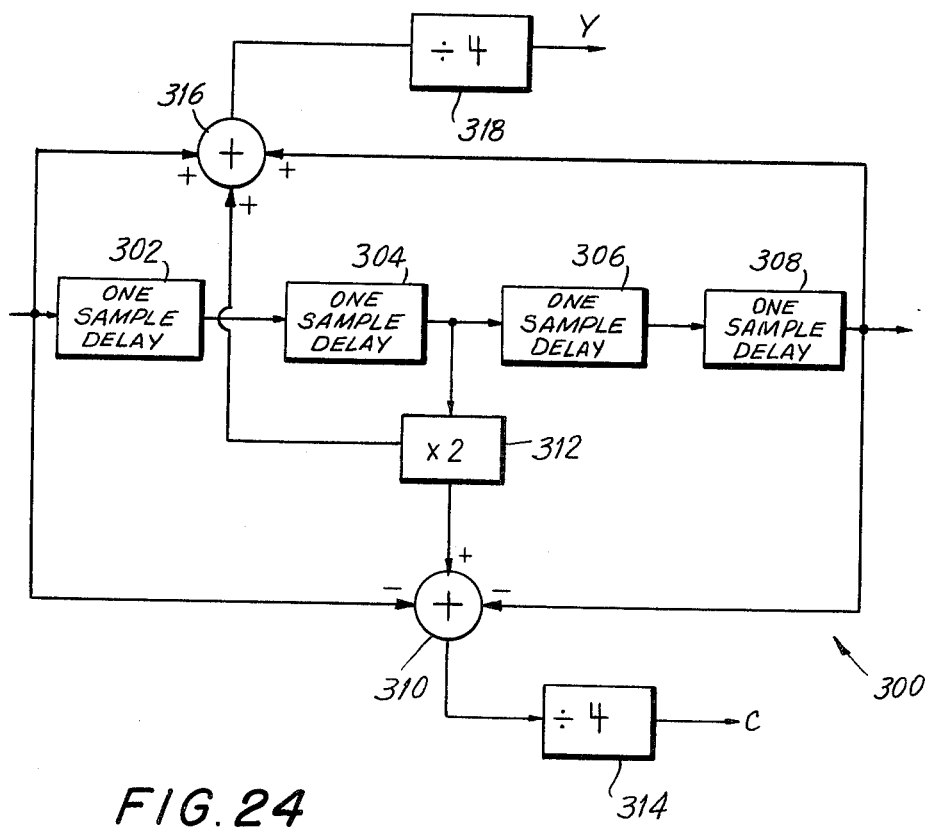
FIG.24

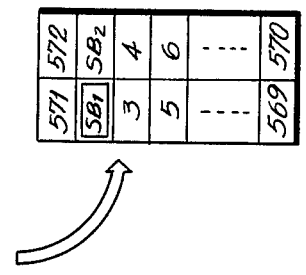

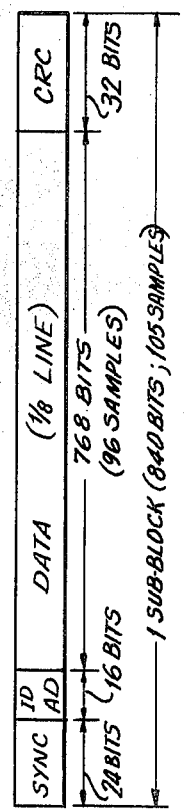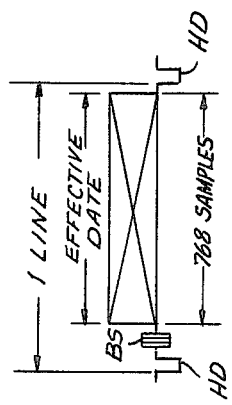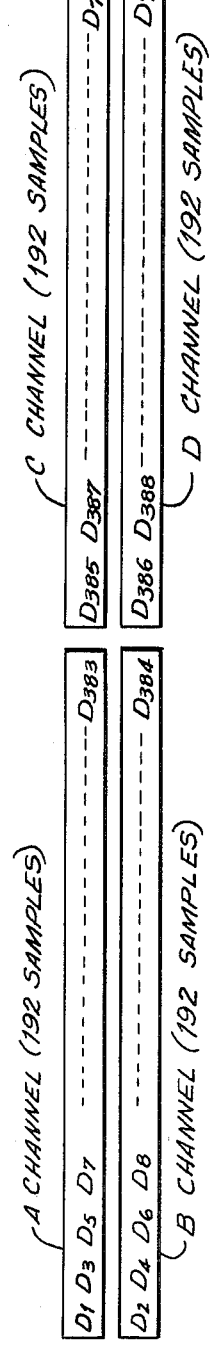
FIG.23
FIG.21
FIG.22

METHOD FOR RECORDING AND REPRODUCING A DIGITAL COLOR VIDEO SIGNAL

BACKGROUND OF THE INVENTION

This invention relates generally to a data recording and reproducing system and, more particularly, is directed to a method and apparatus for recording and reproducing a digitized color video signal on a magnetic tape.

Conventionally, apparatus for recording and reproducing a color video signal have been of the analog, rather than digital, type. The reason for this is that it has previously been believed that the video signal, when digitized, would have an excessively high recording frequency which, in turn, would result in higher magnetic tape consumption. However, due to progress in the field of high density digital recording, it has recently proved feasible to limit the tape consumption to less than or equal to the amount used by analog apparatus. Accordingly, there has been a recent turn towards development of digital video tape recorders (VTR). Digital VTRs have a very high picture quality, which enables multiple generation dubbing with virtually no picture impairment. Further, digital VTRs provide adjustment free circuits and self-diagnosis systems which enable easier maintenance and higher reliability.

With digital VTRs, an analog video signal is converted into digital form by an A/D converter. it should be appreciated that the sampling frequency and the number of quantization levels are the fundamental parameters which determine the quality of the digitized video signal. Further the digitized signal is coded by an error control encoder so that errors may be corrected and concealed on playback, and further, is coded by a channel encoder to achieve high density digital recording. The coded, digitized signal is then recorded on a magnetic tape by means of a recording amplifier.

In one digital VTR, it has been proposed to separate the digitized video signal into at least two separate channels prior to recording it on a magnetic tape. A magnetic head is associated with each channel and all of the magnetic heads are aligned to record the respective channels on a magnetic tape in parallel tracks extending obliquely on the tape. In order to separate the digitized video signal into, for example, two channels, an interface is provided which distributes alternate 8-bit samples of the digitized video signal into the respective channels. Generally, a plurality of such samples in each channel, for example, 96 samples, are formed into a sub-block of data and each sub-block is provided with suitable identifying and address information for identifying the sub-block. A plurality of sub-blocks are then recorded in sequence in each of the two channels. During reproduction, the two magnetic heads supply the information from the two channels on the magnetic tape to another interface which, based on the identification and address information associated with each sub-block, recombines the video signal data from each sub-block to form a continuous digitized video signal.

It is desirable, however, that the digital VTR, like its analog counterpart, have a high speed search mode in which an operator can view the visual information recorded on the tape at a speed which is substantially higher than normal speed. Because of the high tape speed in the search mode, the magnetic heads do not accurately scan the tracks which have been recorded on the tape at the normal speed but rather, scan a plurality of tracks during each scan. Accordingly, an interchanger is provided in the reproducing section for removing the identifying signal from each sub-block of the reproduced signal, and for distributing the signal sub-block by sub-block to the channel to which it belongs. However, by using such interchanger, the reference phase of the color sub-carrier may not be continuously uniform in the high speed search mode. In other words, such reference phase may be inverted between successive sub-blocks. More particularly, in the recording operation, each recorded track preferably includes one field of video information, with each field being comprised of a plurality of lines and each line, in turn, being further divided into, for example, three sub-blocks of video information. During the reproducing operation in the high speed search mode, each head scans a plurality of tracks so as to reproduce signals from different fields. Therefore, if, for example, sub-block signals from an odd frame and an even frame are intermixed, the reference phase of the color sub-carrier may differ at the connection point of such sub-block signals. In other words, it is possible that a phase inversion of the color sub-carrier occurs between successive sub-blocks of information. It is therefore desirable to detect such phase inversion of the color sub-carrier and correct it immediately by, for example, comparison with a reference phase.

Since the phase inversion only occurs in the chrominance portion of the video signal, it is desirable to separate the chrominance portion from the luminance portion of the video signal prior to correcting such phase inversion, without converting the digital signal to an analog signal. It has been found, however, that with the aforementioned distribution of successive digitized samples alternately into two channels during the recording operation, a composite picture having proper color balance cannot be readily obtained during reproduction in the high speed search mode and separation of the chrominance and luminance portions of the video signal in such high speed search mode can also not readily be accomplished.

OBJECTS AND SUMMARY OF THE INVENTION

Accordingly, it is an object of this invention to provide a method and apparatus for recording a digital color video signal that avoids the above-described difficulties encountered with the prior art.

More particularly, it is an object of this invention to provide a method and apparatus for recording a digital color video signal in which the reference phase of the color sub-carrier thereof is continuously uniform upon reproduction in the high speed search mode.

It is another object of this invention to provide a method and apparatus for recording a digital color video signal in which the chrominance portion of the color video signal can be easily separated during reproduction in the high speed search mode.

In accordance with an aspect of this invention, a method of recording a color video signal in a plurality of parallel tracks extending obliquely on a magnetic tape comprises the steps of sampling the color video signal at a frequency which is at least three times the color sub-carrier frequency of the color video signal, converting the sampled color video signal into digitized form, and recording respective pluralities of the digitized samples which are arranged in a predetermined sequence sequentially in the plurality of parallel tracks.

In a first preferred embodiment of the invention, the last-mentioned step includes recording respective pluralities of contiguous ones of the digitized samples sequentially in the plurality of parallel tracks. For example, in the case where the sampling frequency is four times the color sub-carrier frequency, the contiguous ones of the digitized samples include at least four digitized samples so as to correspond to at least one period of the color sub-carrier. In such case, a separation or filter circuit which can be utilized in the reproducing section for separating the chrominance component of the digital color video signal has a chrominance filter characteristic $C=(1-Z^{-2})/2$, where Z is a one sample delay transfer characteristic of the filter circuit.

In another embodiment of this invention, the last-mentioned step includes alternately separating contiguous ones of the digitized samples into first and second blocks, and recording respective pluralities of successive digitized samples of the first and second blocks sequentially in the plurality of parallel tracks. In such case, the sampling frequency is chosen as four times the color sub-carrier frequency. Each of the first and second blocks is divided into at least one plurality of successive digitized samples with the number of pluralities in each of the first and second blocks being equal to one-half the number of channels into which the digitized signal is divided. A separation or filter circuit is utilized in the reproducing section for separating the chrominance portion of the video signal from the luminance portion thereof during the high speed search mode. Such filter circuit is preferably a fourth order filter having a chrominance filter characteristic $C=\frac{1}{4}(-1+2Z^{-2}-Z^{-4})$, where Z is a one sample delay transfer characteristic of the filter circuit.

The above, and other, objects, features and advantages of this invention, will be apparent from the following detailed description which is to be read in conjunction with the accompanying drawings.

BRIEF DESCRIPTION OF THE DRAWINGS

FIG. 3 is a schematic illustration of a rotary head assembly included in the digital VTR of FIGS. 1 and 2;

FIG. 4 is a schematic view of rotary heads included in the assembly of FIG. 3;

FIG. 5 is a schematic plan view of a section of magnetic tape showing tracks in which the signals are recorded by the recording section of FIG. 1 and illustrating the head trace in the high speed search mode;

FIGS. 6, 7 and 8 are schematic diagrams to which reference will be made in explaining the digitization and code arrangement of a video signal for use in a digital VTR embodying this invention;

FIGS. 16A and 16B are waveform diagrams illustrating the position of the sampling points in regard to the color sub-carrier for two tracks when the sampling frequency is $3f_{sc}$;

FIGS. 18A to 18F are schematic diagrams to which reference will be made in illustrating the memory addresses to which the sub-blocks of one frame are assigned and the positional relationship of the sub-blocks of successive frames in regard thereto;

FIGS. 21-23 are schematic diagrams to which reference will be made in explaining the recording of a digital color video signal according to the second embodiment of this invention, with the apparatus of FIG. 20; and FIG. 24 is a block diagram of a fourth order digital filter which can be used in the reproducing section of a digital VTR according to the second embodiment of this invention.

DESCRIPTION OF THE PREFERRED EMBODIMENTS

Figure 1:
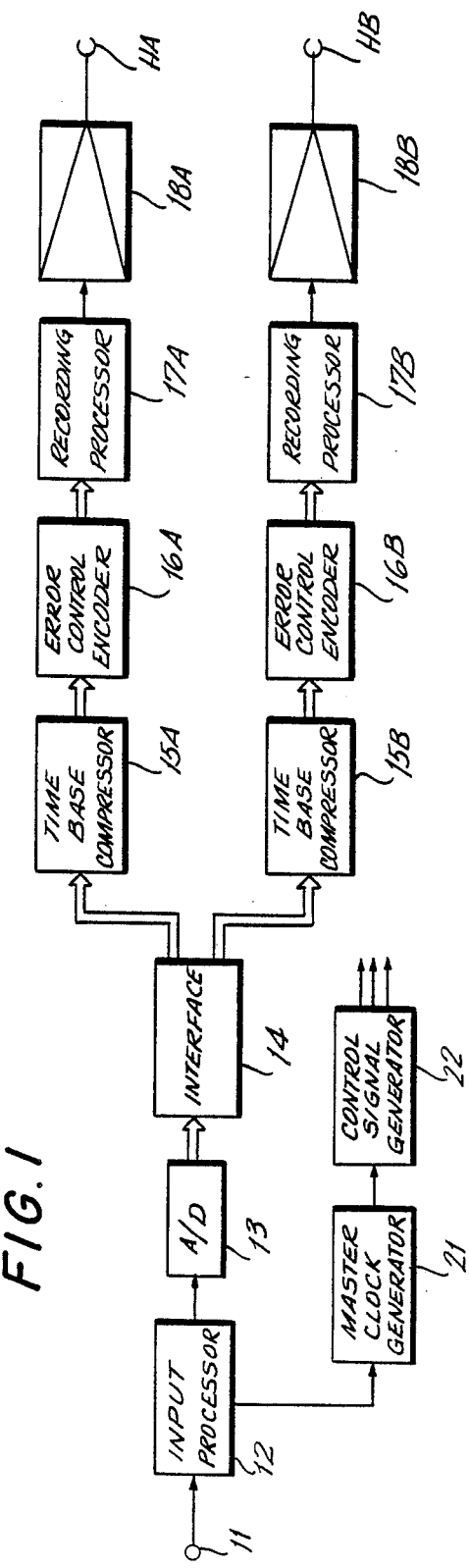
FIG. 1 is a block diagram illustrating a recording section of a digital video tape recorder (VTR) embodying this invention.

In order to facilitate a better understanding of the present invention, there will first be described the conditions for digital recording of an NTSC color video signal.

The NTSC system color video signal is desirably digitized with the following conditions being established:

1. Since one frame comprises 525 lines, the number of lines selected for a first (third) and a second (fourth) field are 262 and 263, respectively. In the first field, a vertical synchronizing pulse and a horizontal synchronizing pulse are in phase with each other, and the field in which they are out of phase is considered the second field.

2. The number of sampled picture elements in each horizonfal period (H) varies with the sampling frequency (fs) employed. Since the color sub-carrier frequency ($f_{sc}$) is 455/2 times the horizontal frequency ($f_H$), the numbers of sampled picture elements in one horizontal period are as shown in the below Table 1 in the case of $fs=3f_{sc}$ and in the case of $fs=4f_{sc}$.

TABLE 1

| fs | | Even line | Odd line |
|---|---|---|---|
| $3f_{sc}$ | Odd frame | 682 | 683 |
| | Even frame | 683 | 682 |
| $4f_{sc}$ | Odd frame | 910 | 910 |
| | Even frame | 910 | 910 |

In the case of $fs=3f_{sc}$, the number of sampled picture elements in the line in which the horizontal synchronizing pulse and the color sub-carrier are in phase with each other is taken as 682, and the number of sampled picture elements in the line in which the horizontal synchronizing pulse and the color sub-carrier are out of phase is taken as 683. The odd frame starts with the line in which the horizontal synchronizing pulse and color sub-carrier are out of phase with each other, whereas the even frame starts with the line in which they are in phase with each other. As will be appreciated from Table 1, in the case of $fs=3f_{sc}$, the number of sampled picture elements in adjacent lines which are in the same field but differ by one horizontal period (1H) in time from each other are different, but if data of the line of the previous field which is positioned one line below is used as an interpolation line, the number of sampled picture elements in the erroneous line and in the interpolation line become equal to each other. Further, the color sub-carriers of the respective sampled picture elements in both of such latter lines are also of the same phase. This aspect is described more fully in U.S. Pat. No. 4,329,708, issued on May 11, 1980 and having a common assignee herewith, the disclosure in such application being incorporated herein.

The present invention will hereinafter be described as being applied to a previously proposed digital VTR made up of a recording section (FIG. 1) and a playback or reproducing section (FIG. 2), and which proposed digital VTR will now be described in greater detail. In the digital VTR, a digital video signal is recorded by a rotary head assembly (FIG. 3) in parallel tracks extending obliquely on a magnetic tape T (FIG. 5). Since the transmitting bit rate of the digital video signal is high, two rotary heads $H_A$ and $H_B$ (FIG. 4) are disposed in close proximity to each other, and the digital video signals of one field are distributed through two channels to such heads and recorded on the magnetic tape in two parallel tracks $T_A$ and $T_B$. An audio signal may also be converted to a PCM (pulse code modulated) signal and recorded by a rotary head in a third track (not shown) extending parallel to the video tracks $T_A$ and $T_B$.

Figure 2:
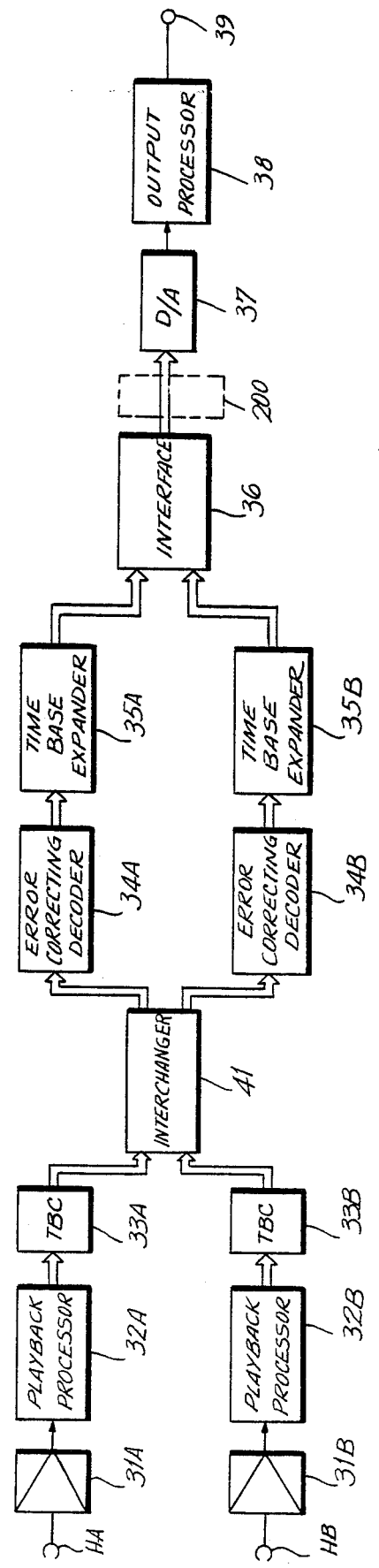
FIG. 2 is a block diagram illustrating a reproducing section of a digital video tape recorder (VTR) embodying this invention.

Referring in detail to FIG. 1, it will be seen that an NTSC color video signal to be recorded is applied through an input terminal 11 to an input processor 12. The input processor 12 comprises a clamp circuit and a synchronizing and burst signal separator and supplies the effective or video information portion of the color video signal to an A/D converter circuit 13. A synchronizing signal and a burst signal separated from the color video signal by processor 12 are applied to a master clock generator 21 which is desirably of PLL (phase locked loop) construction. The master clock generator 21 generates clock pulses of the sampling frequency, for example, $3f_{sc}$ or $4f_{sc}$. The clock pulses from generator 21 and the synchronizing signal are applied to a control signal generator 22 which produces various kinds of timing pulses, identifying signals (ID) for identifying lines, fields, frames and tracks, and a control signal, such as, a train of sampling pulses.

The A/D converter circuit 13 generally comprises a sample and hold circuit and an A/D converter for converting each sampled output to an 8-bit code which is supplied, in parallel form, to an interface 14. The duration or period of one line (1H) of the NTSC color video signal is 63.5µs and a blanking period therein is 11.1 µs. Accordingly, the period of the effective video region or portion is 52.4 µs. When the sampling frequency is $3f_{sc}=[(3\times455)/2]f_H$, the number of samples in one horizontal period is 682.5. Further, the number of samples in the effective video region or portion is 52.4 µs/Ts = 562.7 samples, where Ts is the sampling period equal to 0.0931217 µs. In consideration of the division of the video information to be recorded into two channels, the number of effective video samples is selected to be 576 per line or horizontal period with 288 samples being assigned to each channel. As shown in FIG. 6, two horizontal periods (1365 samples) are considered as one unit, with the total number of samples in the line in which a horizontal synchronizing pulse HD and the color sub-carrier are in phase with each other being selected to be 682 and the total number of samples in the line in which they are out of phase being selected to be 683.

The number of lines forming one field is 262.5H, with a vertical synchronizing period and an equalizing pulse period accounting for 10.5H. Since test signals VIT and VIR are inserted in the vertical blanking peiod, they are also regarded as effective video signals. Finally, the number of effective video lines in one field period is selected to be 252.

The digitized effective video region of the color video signal is divided by interface 14 of the proposed digital VTR into two channels. Of the 576 samples in each line, data corresponding to the odd-numbered samples are assigned to one of the channels and data corresponding to the even-numbered samples are assigned to the other channel. The data of the two channels are processed in the same manner. The data in one of the channels is derived as a record signal for head $H_A$ after being applied, in sequence, to a time base compression circuit 15A, an error control encoder 16A, a recording processor 17A and a recording amplifier 18A. The data in the other channel is also processed by the same arrangement, that is, by a time base compression circuit 15B, an error control encoder 16B, a recording processor 17B and a recording amplifier 18B, to provide a record signal for head $H_B$. The recording amplifiers 18A and 18B are connected by way of a rotary transformer (not shown) to the rotary heads $H_A$ and $H_B$ disposed in close proximity to each other.

Figure 8:
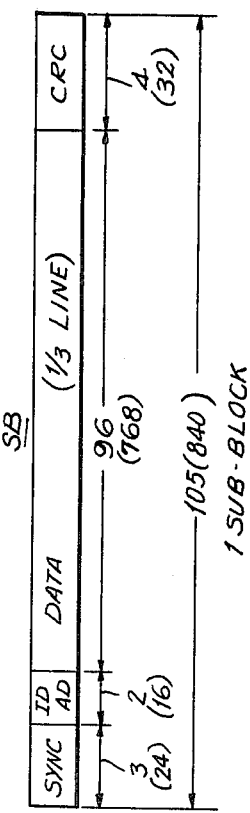

The code arrangement of each of the record signals respectively provided at heads $H_A$ and $H_B$ will now be described with reference to FIG. 8. As there shown, a sub-block of the coded digital signal is composed of 105 samples (840 bits) in which a block synchronizing signal (SYNC) of three samples (24 bits), an identifying (ID) and address (AD) signal of two samples (16 bits), information data of 96 samples (768 bits) and CRC (Cyclic Redundancy Check) code of four samples (32 bits) are arranged one after another. The data of one line or horizontal period of the color video signal comprises 288 samples per channel, as previously mentioned, and these samples are divided into three sub-blocks, that is, there are three sub-blocks for each line, with 96 samples for each sub-block. The block synchronizing signal is used for identifying the beginning of a sub-block, whereupon the identifying and address signals, the information data and/or CRC code can be extracted. The identifying signals ID indicate the channel (track), the frame, the field and the line to which the information data of the sub-block belongs, and the address signal AD represents the address of the respective sub-block. The CRC code is used for the detection of an error in the information data of the respective sub-block.

Figure 7:
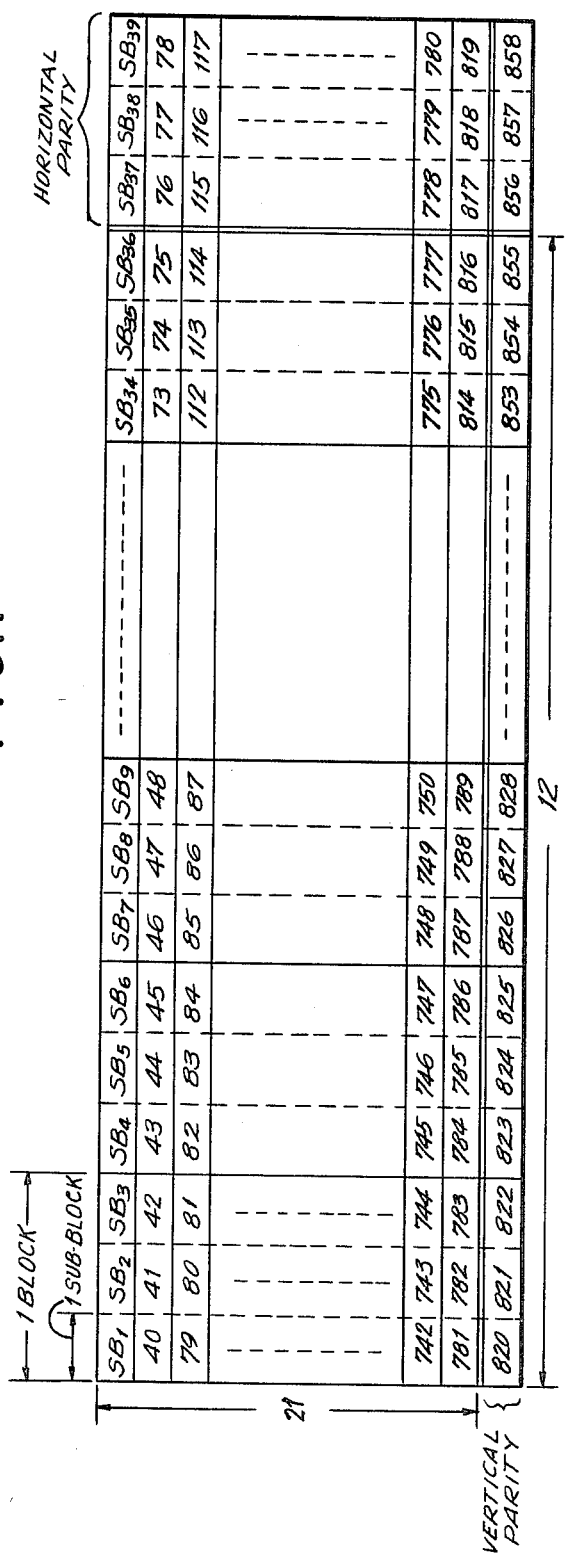

FIG. 7 shows the code arrangement for one field in one channel. In FIG. 7, each reference character SBi (i=1~858) indicates one sub-block, with three sub-blocks making up one block or line. Since the effective video region of one field is comprised of 252 lines, as mentioned previously, the data of 252 blocks (756 sub-blocks) exist in one field. The video information data of a particular field are sequentially arranged in a 21×12 matrix form. Parity data are also provided in connection with the horizontal and vertical directions, respectively, of the video information data in the matrix. More particularly, on FIG. 7, the parity data for the horizontal direction is shown positioned in the thirteenth column of blocks, and the parity data for the vertical direction is positioned in the twenty-second row at the bottom. In the thirteenth column of blocks at the twenty-second row is disposed the horizontal parity data for the vertical parity data. The parity data for the horizontal direction is formed in three ways by 12 sub-blocks respectively taken out of the 12 blocks forming one row of the matrix. In the first row, for example, parity data $SB_{37}$ is formed by the modulo 2 addition:

$$[SB_1] \oplus [SB_4] \oplus [SB_7] \oplus \ldots \oplus [SB_{34}] = [SB_{37}]$$

In the above, [SBi] means only the data in the respective sub-block SBi. In this case, samples belonging to respective ones of the 12 sub-blocks are each calculated in a parallel, 8-bit form. Similarly, by the modulo 2 additions:

$$[SB_2] \oplus [SB_5] \oplus [SB_8] \oplus \ldots \oplus [SB_{35}] = [SB_{38}]$$

$$[SB_3] \oplus [SB_6] \oplus [SB_9] \oplus \ldots \oplus [SB_{36}] = [SB_{39}]$$

parity data $[SB_{38}]$ and $[SB_{39}]$ are formed. The parity data is similarly formed for each of the second to twenty-second rows in the horizontal direction. Enhancement of the error correcting ability results from the fact that parity data is not formed merely by the data of the 36 sub-blocks included in a row, but is formed by the data of 12 sub-blocks positioned at intervals of two sub-blocks in the row.

The parity data for the vertical direction is formed by the data of 21 sub-blocks in each of the first to twelve columns of blocks. In the first column, parity data $[SB_{820}]$ is formed by the modulo 2 addition:

$$[SB_1] \oplus [SB_{40}] \oplus [SB_{79}] \oplus \ldots [SB_{781}] = [SB_{820}]$$

In this case, samples belonging to each one of the 21 sub-blocks are calculated in a parallel 8-bit form.

Accordingly, these parity data comprise 96 samples as is also the case with the video data of each sub-block. In the case of transmitting the digital signal of one field of the above matrix arrangement (22×13) as a series of first, second, third, ... twenty-second rows in sequence, since 13 blocks correspond to the length of 12H, a period of 12×22=264H is needed for transmitting the digital signal of one field.

Incidentally, if the VTR is of the C-format type, and thus employs an auxiliary head for recording and reproducing one part of the vertical blanking period in one field, then a duration of only about 250H can be recorded with a video head. In accordance with the present invention, a duration of 246H, leaving a margin of several H's has to be recorded in each track, that is, the period of 264H of data to be transmitted is time-base-compressed (with a compression ratio Rt of 41/44) to a period a duration of 246H. Further, a pre-amble signal and a post-amble signal, each having the transmitting bit frequency, are inserted at the beginning and the terminating end of the record signal of one field having the period of 264H.

The time base compression circuit 15 in FIG. 1 compresses the video data with the above-noted compression ratio 41/44 and provides a data blanking period in which the block synchronizing signal, the identifying and address signals and the CRC code are inserted for each sub-block of video data of 96 samples, and at the same time, sets up data blanking periods in which the blocks of the parity data are inserted. The parity data for the horizontal and vertical directions and the CRC code of each sub-block are generated by the error control encoder 16. The block synchronizing signal and the identifying and address signals are added to the video data in the recording processor 17. The address signal AD represents the previously noted number (i) of the sub-block. Further, in the recording processor 17 there are provided an encoder of the block coding type which converts the number of bits of one sample from 8 to 10, and a parallel-to-serial converter for serializing the parallel 10-bit code. As disclosed in detail in U.S. patent application Ser. No. 171,481, filed July 23, 1980 and having a common assignee herewith, the block coding is such that $2^8$ codes whose DC levels are close to zero are selected from $2^{10}$ codes of 10-bit and arranged to have one-to-one correspondence to the original 8-bit codes. By means of the foregoing, the DC level of the record signal is made as close to zero as possible, that is, "0" and "1" alternate with each other as much as possible. Such block coding is employed for preventing degradation of the transmitting waveform on the playback side by substantial DC free transmission. It is also possible to achieve the same results by employing a scramble system utilizing the so-called M-sequence which is substantially random in place of the block coding. In the case where each sample comprises 8 bits, the transmitting bit rate per channel is as follows:

$$(3f_{sc}) \times 8 \times \tfrac{1}{2} \times \frac{44}{41} = 46.097 \ Mb/sec.$$

After converting the above 8-bit code to the 10-bit code, the recording bit rate is as follows:

$$46.097 \times \frac{10}{8} = 57.62 \ Mb/sec.$$

In the reproducing or playback operation of the digital VTR according to this invention, the two channels of reproduced signals are derived from the heads $H_A$ and $H_B$ which scan tracks $T_A$ and $T_B$, respectively, corresponding thereto, and are applied through playback amplifiers 31A and 31B to respective waveform shaping circuits (not shown). Each of the waveform shaping circuits includes a playback equalizer for increasing the high-frequency component of the reproduced signal and shapes the reproduced signal to a clear pulse signal. Further, each waveform shaping circuit extracts a reproducing bit clock synchronized with the pre-amble signal and supplies the reproducing bit clock to a respective playback processor 32A or 32B together with the data. In each of the playback processors 32A and 32B, the serial data is converted to parallel form, the block synchronizing signal is extracted, the data is separated from the block synchronizing signal and from the ID, AD and CRC codes or signals, and further, block decoding or 10-bit to 8-bit conversion is performed. The resulting data is applied to a respective time base corrector 33A or 33B in which any time base error is removed from the data. Each of the time base correctors 33A or 33B is provided with, for example, four memories, in which reproduced data are sequentially written by clock pulses synchronized with the reproduced data, and the data are sequentially read out from the memories, by reference clock pulses. When the reading operation is likely to get ahead of the writing operation, the memory from which the data has just been read is read again.

The data of each channel is provided from the respective one of the time base correctors 33A and 33B to one of the other of error correcting decoders 34A and 34B by way of a common interchanger 41. In an ordinary playback operation in which the rotary heads faithfully scan the recording tracks on the magnetic tape or in slow motion or still picture playback in which the rotary heads are controlled in position so that they faithfully follow the recording tracks respectively, signals are reproduced only from the tracks $T_A$ and $T_B$ corresponding to the two rotary heads $H_A$ and $H_B$. However, during high speed reproducing, in which the running speed of the magnetic tape is as high as several tens of times its ordinary speed, each of the rotary heads scans a plurality of recording tracks, as shown by line HSM (high speed mode) in FIG. 5. As a result, signals reproduced from the tracks $T_A$ and $T_B$ are mixed together. In such a case, the interchanger 41 identifies the correct channels of the reproduced signals, using track identifying signals, and supplies the reproduced signals to the error correcting decoder 34A or 34B for the respective channel.

Each error correcting decoder 34A or 34B includes error detecting and correcting circuits using CRC, horizontal and vertical parities, a field memory and so on. However, during high speed reproducing, no error detection and correction are carried out and the field memory is used instead for converting the intermittently received reproduced data of each channel into a continuous form. The data from each error correcting decoder 34A or 34B is applied to a respective time base expander circuit 35A or 35B, respectively, which returns the data to the original transmitting rate and then applies the data to a common interface 36. The interface 36 serves to return the reproduced data of the two channels into a single channel which includes a D/A converter circuit 37 for conversion of the data into analog form. From the interface 36 there may also be provided a digital video output (not shown). Since a digital video input and a digital video output may be provided in the recording and reproducing sections of FIGS. 1 and 2, editing and dubbing can be carried out with digital signals, that is, without conversion from and/or to analog form.

The output from the D/A converter circuit 37 is applied to an output processor 38, from which a reproduced color video signal is provided at an output terminal 39. An external reference signal may be supplied to a master clock generator (not shown), from which clock pulses and a reference synchronizing signal are provided to a control signal generator (not shown). The control signal generator provides control signals synchronized with the external reference signal, such as, various timing pulses, identifying signals for the line, field and frame, and sample clock pulses. In the reproducing section, the processing of the signals from heads $H_A$ and $H_B$ to the input sides of time base correctors 33A and 33B is timed by the clock pulse extracted from the reproduced data, whereas the processing of the signals from the output sides of the time base correctors 33A and 33B to the output terminal 39 is timed by the clock pulse from the master clock generator.

As previously discussed, interchanger 41 (FIG. 2), in the reproducing section, supplies the correct signals to error correcting decoders 34A and 34B during reproduction in the high speed search mode. In other words, interchanger 41 removes the identifying signal ID from each sub-block SB in the reproduced digital signal and distributes the signal sub-block by sub-block to the correct channel to which it belongs. However, interchanger 41 does not take into account any error in the phase of the color sub-carrier, as will now more fully be described.

In the NTSC system, as previously discussed, each frame comprises 525 lines which are divided into two fields such that the first field contains 262 lines and the second field contains 263 lines of data. It should be appreciated that, since the second field in each frame includes an additional line, the first line in the second field will be positioned one line above the first line in the first field. With a digital video tape recorder (VTR), an effective frame is selected and may be arranged, for example, so that the first field thereof includes video information in lines 12–263 and the second field includes video information in lines 274–525. In this manner, each of the first and second fields of each frame includes 252 field lines of video information.

Figure 9:
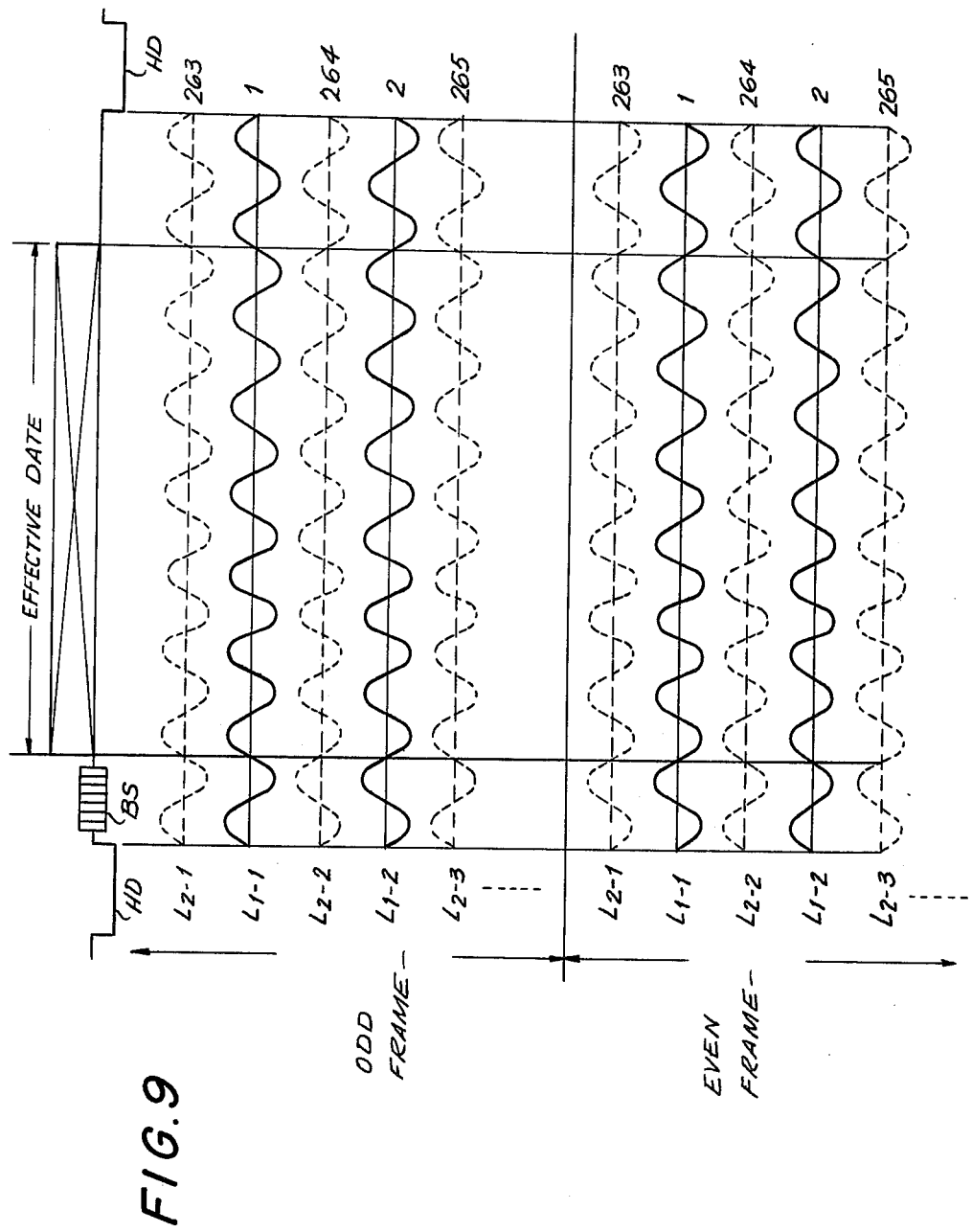
FIG. 9 is a waveform diagram illustrating the phase relationship of the color sub-carrier between lines of different fields and frames.

Referring now to FIG. 9, which illustrates the phase relationship or waveforms of the color sub-carrier of the color video signal for scan lines of a picture in first (odd) and second (even) frames, lines in the first field of each frame are indicated by solid lines while lines in the second field are indicated by broken lines, with the phase of the sub-carrier being shown superimposed thereon. In the waveform diagram of FIG. 9, the first or odd frame is comprised of a first field composed of lines $L_{1-1}$, $L_{1-2}$, ... $L_{1-262}$ and is represented by solid lines. The second field in the odd frame is composed of lines $L_{2-1}$, $L_{2-2}$, ... $L_{2-263}$, this latter line corresponding to line 525 in the odd frame. In like manner, the second or even frame is comprised of a first field composed of lines $L_{1-1}$, $L_{1-2}$, ... $L_{1-262}$ and the second field of the even frame is composed of lines $L_{2-1}$, $L_{2-2}$, ... $L_{2-263}$. Each of the above lines is preferably comprised of three sub-blocks SBi to SBi+2, with lines of both frames with the same numerical suffix being comprised of identically-numbered sub-blocks. For example, each of lines $L_{2-1}$ and $L_{1-1}$ in the odd frame and lines $L_{2-1}$ and $L_{1-1}$ in the even frame is comprised of sub-blocks which are numbered SB1 to SB3. Thus, lines in the odd and even frames with the same numerical suffixes are stored in the same addresses in a respective field memory. In other words, each of lines $L_{2-1}$ and $L_{1-1}$ in the odd and even frames have the same address signal AD associated with the three sub-blocks SB1 to SB3 of which they are comprised.

During reproduction in the high speed search mode, reproducing heads $H_A$ and $H_B$ each helically scan both tracks $T_A$ and $T_B$. In this manner, the reproduced digital signal from head $H_A$ includes signals from both channel A and channel B and head $H_B$ also reproduces the digital signal from both channel A and channel B. Because of such arrangement in the high speed search mode, error control decoders 34A and 34B do not perform an error correction operation. Instead, the reproduced signals from heads $H_A$ and $H_B$ are merely stored in respective addresses of a field memory in correspondence with the addresses of the reproduced sub-blocks thereof. It should further be appreciated that, during reproduction in the high speed search mode, each of heads $H_A$ and $H_B$ scans at least one sub-block for each track scanned so that at least one address signal AD can be used for storing the data corresponding to the reproduced sub-block in its respective address of the field memory.

However, during reproduction in the high speed search mode, the signals of the odd and even fields and odd and even frames are intermixed and some signals corresponding to a particular address may not even be reproduced. Thus, for example, if the signal of line $L_{1-1}$ in the odd frame is written in the field memory at the address corresponding to the first line of the field memory and the signal of line $L_{2-2}$ of the same odd frame is next written in the field memory at the address corresponding to the second line of the field memory, the phase relationship therebetween remains the same. In other words, referring to FIG. 9, it is seen that the phase of the sub-carrier at the end of line $L_{1-1}$ of the odd frame is in proper phase relation with the phase of the sub-carrier at the beginning of line $L_{2-2}$ thereof so that a uniform phase relationship exits. In comparison, if, for example, the signal of line $L_{2-1}$ of the odd frame is written in the field memory at the address corresponding to the first line of the field memory and the signal of line $L_{1-2}$ of the even frame is written in the field memory at the address of the second line thereof, the phase of the color sub-carrier is inverted when the signal read from the memory changes from line $L_{2-1}$ of the odd frame to line $L_{1-2}$ of the even frame. In other words, the phase of the color sub-carrier at the end of line $L_{2-1}$ of the odd frame is out of phase with the phase of the color sub-carrier at the beginning of line $L_{1-2}$ of the even frame so that a uniform phase relationship does not exist. Thus, the phase of the sub-carrier is inverted when these two lines are read continuously from the memory. It should be appreciated, however, that although such phase inversion has been indicated as existing between entire lines of the recorded signal, such inversion of the phase of the color sub-carrier most probably occurs between respective sub-blocks of each stored line. In any event, the phase of the color sub-carrier is not uniform during reproduction in the high speed search mode.

Therefore, during reproduction in the high speed search mode, any phase inversion of the color sub-carrier between successive reproduced sub-blocks must be detected and corrected immediately. It should be appreciated, however, that it is only the chrominance portion of the video signal which contains the color sub-carrier. It is therefore only necessary to correct the chrominance portion of the digital video signal, rather than the entire video signal. Accordingly, it is desirable to separate the chrominance portion of the video signal from the luminance portion thereof, to correct the phase inversion of the separated chrominance portion, and then to recombine the separated chrominance and luminance portions. Unfortunately, this cannot be readily accomplished in the previously-proposed system in which successive samples of the digital signal are alternately separated into two channels and recorded in two separate tracks $T_A$ and $T_B$ corresponding to such channels A and B, respectively. In other words, known digital filters cannot satisfactorily or readily separate the chrominance portion from the luminance portion of the color video signal in the reproducing section when the digital color video signal is recorded with this method.

Figure 10:
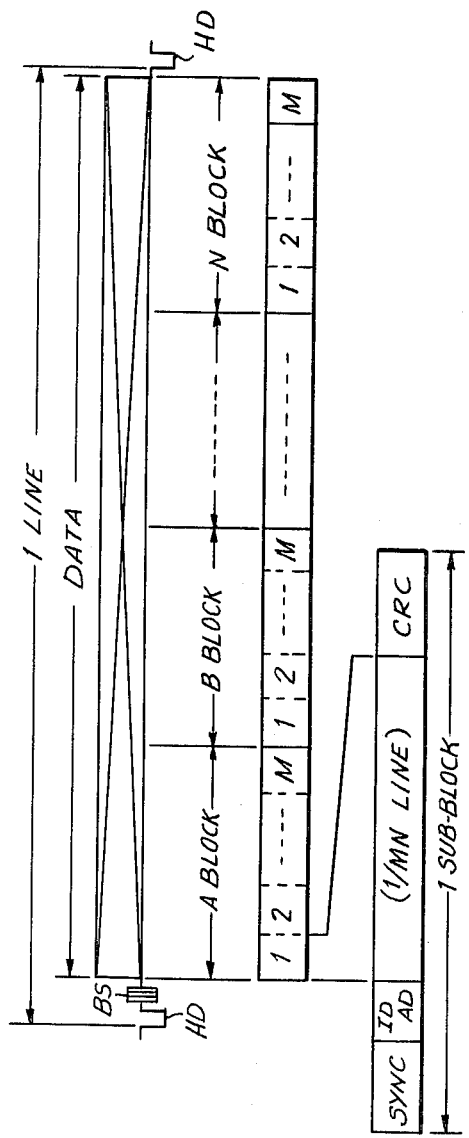
FIG. 10 is a schematic diagram illustrating the structure of one block of digitized information to be recorded in a track corresponding to one channel, according to a first embodiment of this invention.
Figure 11:
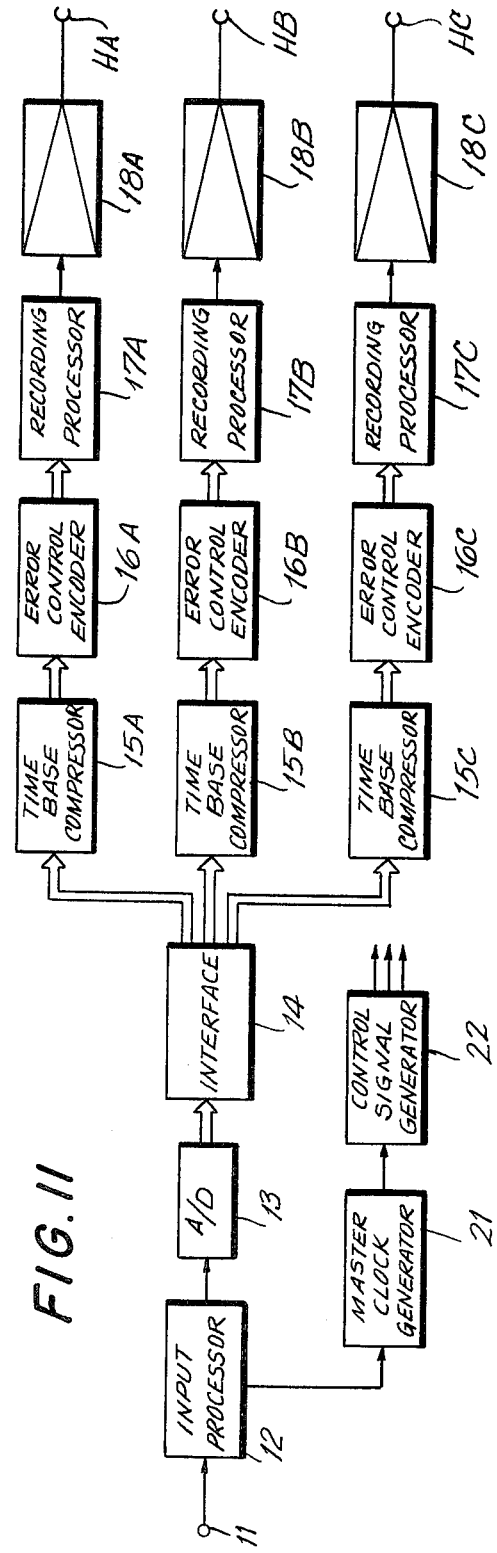
FIG. 11 is a block diagram of a recording circuit of a digital VTR for recording a digital color video signal according to the first embodiment of this invention.
Figure 13:
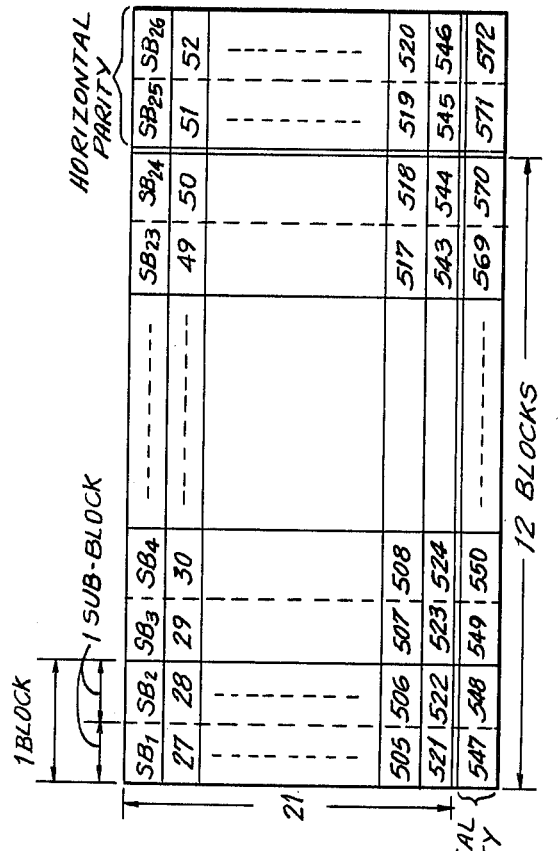
FIG. 13 is a schematic diagram to which reference will be made in explaining the digitization and code arrangement of a color video signal for use with the apparatus of FIG. 11.
Figure 12:
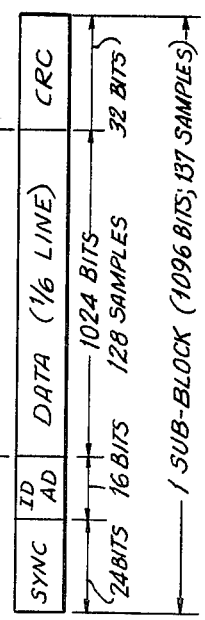
FIG. 12 is a schematic diagram illustrating the structure of one block of digitized information to be recorded in a track corresponding to one channel, with the apparatus of FIG. 11.
Figure 14:
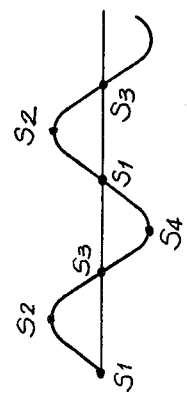
FIG. 14 is a waveform diagram illustrating the position of the sampling points in regard to the color sub-carrier when the sampling frequency is $4f_{sc}$.

Accordingly, a method and apparatus for recording a digital color video signal according to one embodiment of this invention will now be described. Generally, with such method, the effective video region of the color video signal in each horizontal scan line is divided into N blocks, as shown in FIG. 10, in which N is equal to the number of channels in which the signal is distributed and is greater than or equal to two. Thus, the signals in blocks A to N are recorded in respective tracks $T_A$ to $T_N$ which correspond to channels A to N, respectively. Each block is further comprised of M sub-blocks where each sub-block contains a signal corresponding to L cycles of the color sub-carrier, L and M being positive integers. Each sub-block further includes a block synchronizing signal (SYNC), an identifying (ID) and address (AD) signal and a CRC code, as previously discussed. Further, in accordance with the method of this invention, the sampling frequency fs is selected as $Kf_{sc}$, where K is an integer greater than or equal to three. It should therefore be appreciated that signals corresponding to at least one cycle of the color sub-carrier are recorded in each track. For example, if $fs=4f_{sc}$, $L=1$, and $M=1$, four contiguous samples are successively recorded in each track. A specific example of this method is shown in FIGS. 11-13 in which $N=3$, $M=2$, $L=32$ and $K=4$. The code arrangement of each of the record signals respectively provided to heads $H_A$, $H_B$ and $H_C$ is shown in FIGS. 12 and 13. As there shown, the data of one line or horizontal period of the color video signal comprises 256 samples per channel, which is divided into two sub-blocks for each channel with 128 samples of data for each sub-block. Each sub-block of the coded digital signal may be composed of 137 samples (1096 bits) in which a block synchronizing signal (SYNC) of three samples (24 bits), an identifying (ID) and address signal of two samples (16 bits), the information data of 128 samples (1,024 bits) and CRC code of four samples (32 bits) are arranged one after another as previously discussed in regard to FIG. 8. FIG. 13 shows the code arrangement for one field in one channel. In FIG. 13, each reference character $SB_i(i=1 \sim 572)$ indicates one sub-block, with two sub-blocks making up one block or line per channel. Since the effective video region of one field is comprised of 252 lines, as mentioned previously, the data of 252 blocks (504 sub-blocks) exist in one field. The video information data of a particular field are sequentially arranged in a $21 \times 12$ matrix form with parity data also being provided in connection with the horizontal and vertical directions, respectively, of the video information data in the matrix, as previously discussed in regard to FIG. 8. With this latter arrangement, the first block of the first line is recorded in track $T_A$, the second block is recorded in track $T_B$ and the third block is recorded in track $T_C$. The first block of the next line is then recorded in track $T_A$ following the first block of the first line, the second block in track $T_B$ following the second block of the first line, the third block in track $T_C$ following the third block of the first line, as so on. It should therefore be appreciated that 256 digitized contiguous or consecutive samples are recorded successively in each block in each track. For example, the digitized samples which are recorded in tracks $T_A$, $T_B$ and $T_C$ are arranged as follows:

$T_A: S_1 \ldots S_{256}; S_{769} \ldots S_{1,024}; S_{1,537} \ldots$ $T_B: S_{257} \ldots S_{512}; S_{1,025} \ldots S_{1,280}; S_{1,793} \ldots$ $T_C: S_{513} \ldots S_{768}; S_{1,281} \ldots S_{1,536}; S_{2,049} \ldots$ A more simplified example of the method according to this invention will now be described for explaining how the chrominance portion of the color video signal can be easily separated therefrom. Thus, in the case where the digital signal is separated into only two channels A and B, a first plurality of contiguous digitized samples is recorded in a first track $T_A$, a second plurality of contiguous digitized samples which is contiguous with the first plurality is recorded in a second track $T_B$, a third plurality of contiguous digitized samples which is contiguous with the second plurality is next recorded successively in the first track $T_A$, and so on, whereby each plurality of contiguous digitized samples contains signals which correspond to at least one cycle of the color sub-carrier. For example, in the case where the sampling frequency is equal to $4f_{sc}$, four samples correspond to one cycle of the color sub-carrier. Thus, in the case where the digital signal is separated into two channels and $L=M=1$, the first plurality of contiguous digitized samples includes samples $S_1, S_2, S_3$ and $S_4$, which are recorded in track $T_A$. The next successive or sequential plurality of contiguous digitized samples includes samples $S_5, S_6, S_7$ and $S_8$, which are recorded in track $T_B$. The third plurality of contiguous digitized samples includes samples $S_9, S_{10}, S_{11}$ and $S_{12}$, which are recorded in track $T_A$ following the first plurality of contiguous samples $S_1, S_2, S_3$ and $S_4$. Thus, the digitized samples which are recoded in tracks $T_A$ and $T_B$ are arranged as follows:

$T_A: S_1\ S_2\ S_3\ S_4\ S_9\ S_{10}\ S_{11}\ S_{12}\ S_{17}\ S_{18}\ S_{19}\ S_{20}\ S_{25} \ldots$ $T_B: S_5\ S_6\ S_7\ S_8\ S_{13}\ S_{14}\ S_{15}\ S_{16}\ S_{21}\ S_{22}\ S_{23}\ S_{24}\ S_{29} \ldots$ With the above method of recording, the chrominance portion of the video signal can be easily separated in the reproducing section by a suitable chrominance filter, as will now be shown for the case where the sampling frequency $fs=4f_{sc}$. If the sampling frequency is selected as $4f_{sc}$, as shown in FIG. 14, the signal levels of the sampling points of the color sub-carrier signal at 0°, 90°, 180° and 270° are $S_1, S_2, S_3$ and $S_4$, respectively. Since the signal level $S_k$ of a color video signal in the NTSC system is defined as follows:

$$S_k = Y_N + \frac{1}{1.14}(R - Y)\cos\omega_c t \quad (1)$$

-continued
$$+ \frac{1}{2.03}(B - Y)\sin\omega_c t$$

$$= Y_N + DR_N \cos\omega_c t + DB_N \sin\omega_c t,$$

where:

$$\omega_c = 2\pi f_c, \quad (2)$$

$$DR_N = \frac{1}{1.14}(R - Y) \quad (3)$$

$$DB_N = \frac{1}{2.03}(B - Y), \quad (4)$$

then the following equations for $S_1, S_2, S_3$ and $S_4$ can be obtained:

$$S_1 = Y_1 + DR_1 \quad (5)$$
$$S_2 = Y_2 + DB_2 \quad (6)$$
$$S_3 = Y_3 - DR_3 \quad (7)$$
$$S_4 = Y_4 - DB_4, \quad (8)$$

corresponding to sampling points of 0°, 90°, 180° and 270°, respectively. It should therefore be appreciated that the odd samples include only the red color component of the color video signal while the even samples include only the blue color component of the color video signal.

It will be appreciated that the bandwidth of the color difference signals (R-Y) and (B-Y) is about 500Hz which is much smaller than the sampling frequency $4f_{sc}$, the latter being approximately equal to 14.3 MHz. Accordingly, the period of the color difference signals (R-Y) and (B-Y) is much larger than the sampling period and any change in level of the color difference signal between successive, or even alternate, samples is negligible. Therefore, since the signal level does not change very quickly between such samples, the following approximations can be made:

$DR_1 \cong DR_3$ $DB_2 \cong DB_4$ for the samples in the first plurality of contiguous digitized samples $S_1, S_2, S_3$ and $S_4$. In like manner, the signal level between successive, or even alternate, levels of the luminance portion of the video signal cannot change very quickly because of the same reasons. Therefore, luminance components $Y_1, Y_2, Y_3$ and $Y_4$ can be equated with one another. Thus, upon combining equations (5) and (7), the following equation is obtained:

$$\frac{S_1 + S_3}{2} = \frac{Y_1 + Y_3}{2} + \frac{1}{2}(DR_1 - DR_3) \cong Y_1 \cong Y_3. \quad (9)$$

In like manner, equations (6) and (8) can be combined as follows:

$$\frac{S_2 + S_4}{2} = \frac{Y_2 + Y_4}{2} + \frac{1}{2}(DB_2 - DB_4) \cong Y_2 \cong Y_4. \quad (10)$$

Utilizing equations (9) and (10), it will now be shown how the chrominance and luminance portions of the color video signal can be separated. In particular, from equations (5) and (9), the following equation can be obtained:

$$DR_1 = S_1 - Y_1 = S_1 - \frac{S_1 + S_3}{2} = \frac{S_1 - S_3}{2}. \quad (11)$$

In like manner, from equations (6)–(10), the following equations can also be obtained:

$$DB_2 = -S_2 - Y_2 = S_2 - \frac{S_2 + S_4}{2} = \frac{S_2 - S_4}{2} \quad (12)$$

$$DR_3 = -S_3 + Y_3 = -S_3 + \frac{S_1 + S_3}{2} = \frac{S_1 - S_3}{2} \quad (13)$$

$$DB_4 = -S_4 + Y_4 = -S_4 + \frac{S_2 + S_4}{2} = \frac{S_2 - S_4}{2}. \quad (14)$$

It should therefore be appreciated that the red and blue color difference signals can be obtained from the input digitized samples $S_1$–$S_4$. Therefore, if at least one cycle of the sampled digitized signal is recorded in a track, the luminance and chrominance portions of the video signal can be separated according to the above method. In comparison, in the previously proposed system where successive digitized samples are alternately separated into two channels, each sub-block of data is comprised of only odd or even-numbered digitized samples as follows:

$T_A$: $S_1$ $S_3$ $S_5$ $S_7$ $S_9$ . . .

$T_B$: $S_2$ $S_4$ $S_6$ $S_8$ $S_{10}$ . . .

Thus, during reproduction in the high speed search mode, the samples $S_1$ $S_3$ $S_5$ $S_7$ . . . in track $T_A$ may be reproduced while the corresponding samples $S_2$ $S_4$ $S_6$ $S_8$ . . . in track $T_B$ may not be reproduced. It should be appreciated that, if the above-described method of separating the chrominance portion of the video signal is used only with the odd-numbered samples $S_1$ $S_3$ $S_5$ $S_7$ . . . from track $T_A$, only the red color component of the video signal will be reproduced. In like manner, if only the even-numbered samples $S_2$ $S_4$ $S_6$ $S_8$ . . . from track $T_B$ are reproduced, only the blue color component of the video signal will be reproduced. Thus, a composite color signal cannot be separated from the video signal during reproduction in the high speed search mode if the digitized samples are recorded in accordance with the previously-proposed system.

Figure 15:
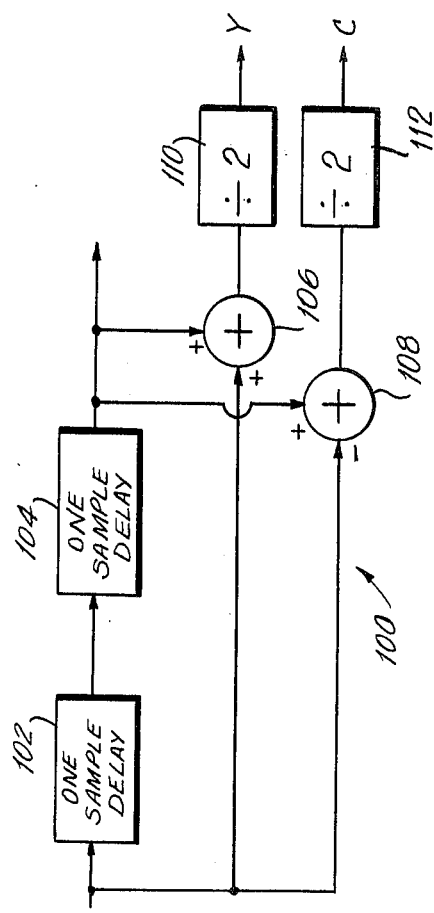
FIG. 15 is a block diagram of a chrominance-luminance separation filter which can be used in the reproducing section of a digital VTR, according to the first embodiment of this invention.

It should be appreciated, however, that each sub-block of information preferably includes a plurality of continuous cycles of the sampled digitized signal so that, in actuality, the contiguous digitized samples in each plurality is greater than four. For example, as previously discussed in regard to the example of FIGS. 11–13, each sub-block may include 32 continuous cycles of the sampled digitized signal so that, in the case of a sampling frequency of $4f_{sc}$, 256 contiguous samples are recorded in each plurality on each track. In such case, a filter circuit 100, as shown in FIG. 15, which is positioned between the output of interface 36 and the input of D/A converter 37 of the reproducing section of FIG. 2 can be used for separating the chrominance and luminance portions of the digital color video signal, with filter circuit 100 having a luminance filter characteristic $Y = [(1 + Z^{-2})/2]$ and a chrominance filter characteristic $C = [(1 - Z^{-2})/2]$, where Z is a one sample delay characteristic of the filter circuit. In particular, the digitized samples of the color video signal are applied through two one sample delay circuits 102 and 104 to the positive inputs of first and second adding circuits 106 and 108. The digitized samples are also supplied directly to the positive input of adding circuit 106 and to the negative input of adding circuit 108. The output signal from adding circuit 106 is supplied through a divide-by-two circuit 110 for producing the separated luminance portion of the color video signal and the output from adding circuit 108 is supplied through a divide-by-two circuit 112 to produce the separated chrominance portion of the video signal. Thus, when the heads $H_A$ and $H_B$ reproduce a signal corresponding to only a single sub-block from one of the tracks, the chrominance portion of the signal can be easily separated and contains both the red and blue color components thereof.

In comparison, with the previously-described proposed method of recording successive digitized samples alternately in the two tracks $T_A$ and $T_B$, filter 100 cannot be utilized to satisfactorily separate the chrominance portion of the video signal from the luminance portion thereof. In such case, to ensure the same relationship of equations (9) and (10), only one one sample delay circuit 102 or 104 would be utilized since, for example, track $T_A$ contains alternate digitized samples $S_1, S_3, S_5, \ldots S_N$. By utilizing such a modified filter circuit, when the digitized samples from track $T_A$ which contain the odd-numbered samples are supplied to the modified filter, only the red color component would be produced. When the even-numbered digitized samples from track $T_B$ are supplied to such modified filter, only the blue color component would be produced. In this manner, no composite color signal could be separated in the filter, and therefore, the phase of the color signal could not be corrected.

In like manner, if the sampling frequency is selected as $3f_{sc}$, as shown in FIG. 16, so that the sampled points correspond to 0°, 120° and 240°, the following equations for $S_1, S_2$ and $S_3$ can be obtained from equation (1):

$$S_1 = Y_1 + DR_1 \ (\omega_c = 0°) \quad (15)$$

$$S_2 = Y_2 - \tfrac{1}{2} DR_2 + \frac{\sqrt{3}}{2} DB_2 \ (\omega_c = 120°) \quad (16)$$

$$S_3 = Y_3 - \tfrac{1}{2} DR_3 - \frac{\sqrt{3}}{2} DB_3 \ (\omega_c = 240°). \quad (17)$$

By utilizing the same analysis which was previously used in regard to the sampling frequency of $4f_{sc}$, the following equations can be obtained:

$$Y \simeq \frac{S_1 + S_2 + S_3}{3} \quad (18)$$

$$DR \simeq S_1 - Y \quad (19)$$

$$DB \simeq (S_2 - S_3)/\sqrt{3}. \quad (20)$$

It should therefore be appreciated that the chrominance and luminance signals can be easily separated as a result of recording the digitized samples according to the above embodiment of this invention. A similar analysis can be done for a sampling frequency greater than $4f_{sc}$.

Figure 17:
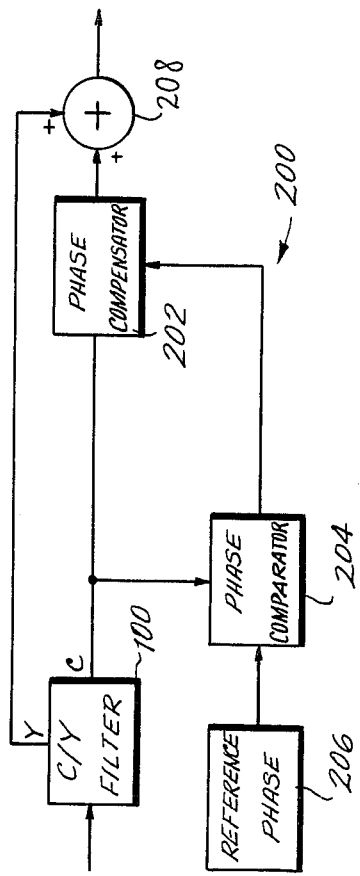
FIG. 17 is a block diagram of a phase correction circuit that can be used for correcting the phase of the color sub-carrier.

Thus, the separated chrominance portion of the video signal can have its phase corrected for each sub-block thereof, for example, by comparison with a desired reference phase. For example, a phase correction circuit 200 shown in FIG. 2 disposed between the output of interface 36 and the input of D/A converter 37 may be provided for correcting the phase of the color sub-carrier. As shown more particularly in FIG. 17, phase correction circuit 200 includes chrominance-luminance separation filter 100 which separates the chrominance and luminance components of the color video signal from interface 36. The chrominance component is supplied to a phase compensator 202 for adjusting the phase thereof in response to a signal from a phase comparator 204. This latter circuit receives the chrominance component from filter 100 and a reference phase signal from a reference phase circuit 206 and supplies an output to phase compensator 202 in response to such phase comparison. In this manner, phase compensator 202 adjusts the phase of the color sub-color in those sub-blocks which contain an error so as to produce a color signal having a color sub-carrier with a uniform phase relation. An adding circuit 208 is supplied with the chrominance component from phase compensator 202 and the luminance component from filter 100 and combines these components to form a composite color video signal which is supplied to D/A converter 37. In this manner, during reproduction in the high speed search mode, when the heads $H_A$ and $H_B$ only scan an area of each track slightly greater than one sub-block, the chrominance portion of the color video signal from each sub-block individually can be separated and the phase thereof can be corrected if it is in error.

It should be appreciated that although the above-described method according to this invention has been implemented to provide a uniform phase of the color sub-carrier during reproduction in the high speed search mode, the method of recording may be utilized in the normal reproducing mode in which an error concealing method is used. In the normal reproducing mode, decoders 34A and 34B generally correct any errors in the reproduced signal by means of a cyclic redundancy code (CRC) and by means of horizontal and vertical parity data. However, if too many errors exist in the signal, the erroneous sub-block which contains these errors is replaced by another sub-block to conceal these errors. It is generally necessary in such error concealing method that the substitute sub-block have a strong vertical correlation with the replaced block, that is, that it should be in close vertical proximity to the replaced sub-block and that the phase of the color sub-carrier of the substitute sub-block should match that of the erroneous replaced sub-block. In this manner, the corresponding sub-block from a line positioned one line below the erroneous line and in the field immediately preceding the field of the erroneous line is substituted so as to satisfy such conditions. Such concealment method will now be described more particularly with respect to FIGS. 18A–18F.

In particular, FIG. 18A represents a field memory in an error correcting decoder 34 in one channel and which contains 572 sub-blocks of data assigned to addresses $AD_1$–$AD_{572}$. FIGS. 18B–18D illustrate the manner in which reproduced data is written into the field memory in the normal reproducing mode. It is seen that the position or address at which the first line of each field is written is shifted down one line in each successive frame. If an error occurs in one of the sub-blocks which is not corrected by the CRC code and the horizontal and vertical parity data, the erroneous sub-block is not written in the respective address in the field memory, but rather, the sub-block which belongs to the previous field and is positioned one line below the line of the erroneous sub-block is substituted therefor. For example, as shown in FIG. 18E, erroneous sub-block SB1 in the odd field of frame (I+1) is replaced by sub-block SB3 of the even field in frame I. As a further example, and as shown in FIG. 18F, an erroneous sub-block SB1 of the even field in frame (I+1) is replaced by sub-block SB1 of the odd field in the same frame. In this manner, any error in the erroneous sub-block can be concealed by a signal which is correlated thereto. Further, with such concealment method, the phase of the color sub-carrier remains uniform in the normal reproducing mode. See the aforementioned U.S. Pat. No. 4,329,708.

Figure 19:
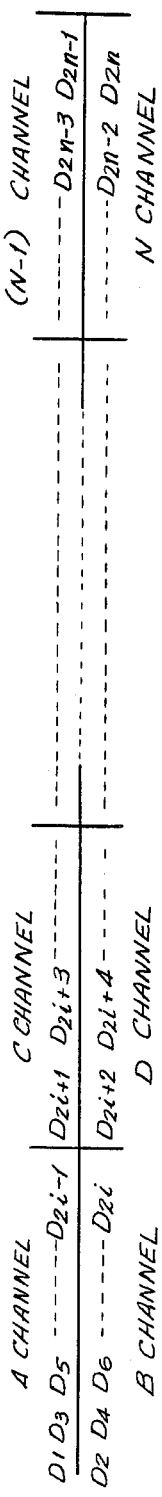
FIG. 19 is a schematic diagram to which reference will be made in explaining the recording of the digital color video signal according to a second embodiment of this invention.
Figure 20:
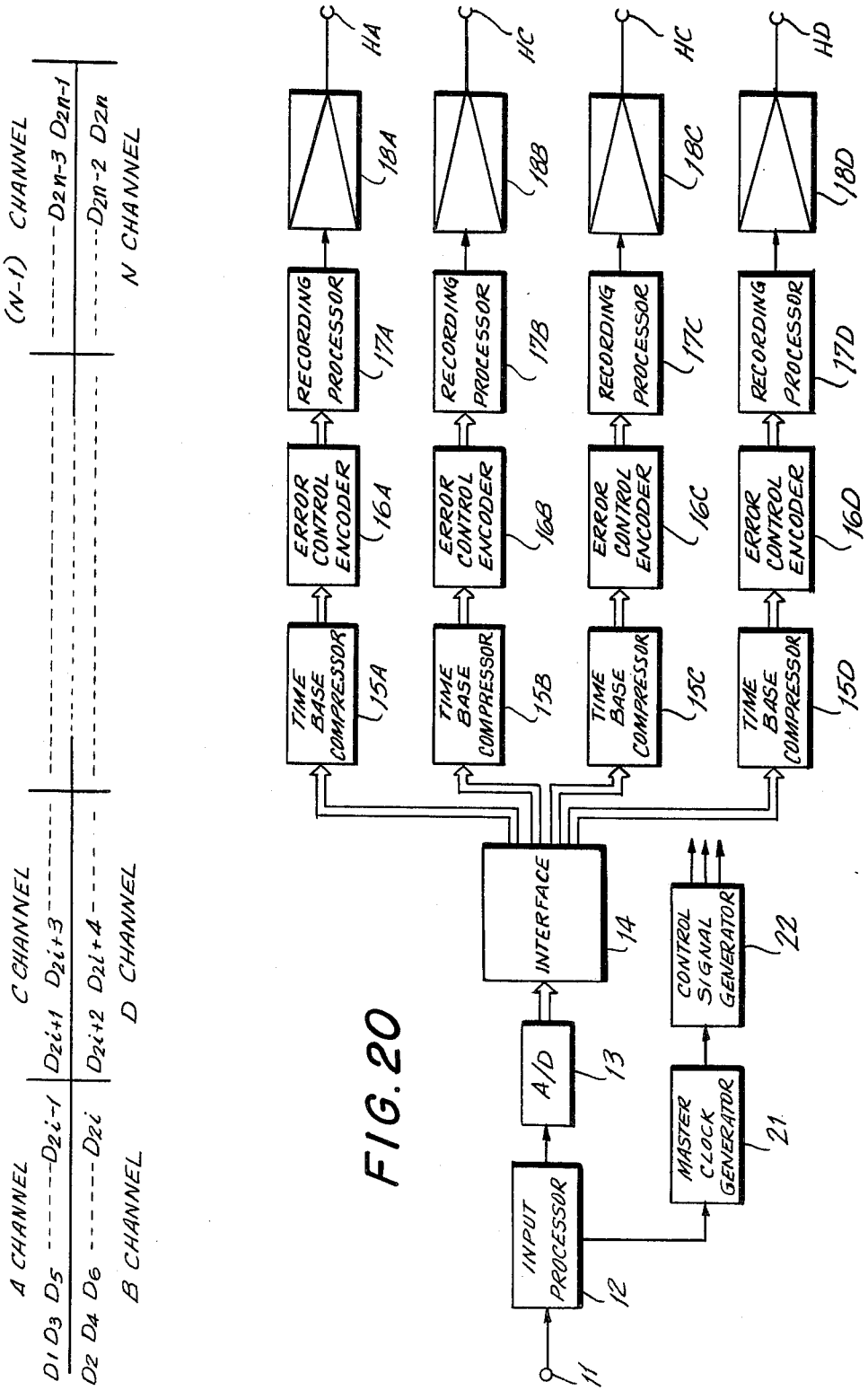
FIG. 20 is a block diagram of the recording section of a digital video tape recorder (VTR) for recording a digital color video signal according to the second embodiment of this invention.

In accordance with another embodiment of this invention, the phase of the color sub-carrier of the color video signal, which is sampled at a frequency of $4f_{sc}$, can easily be made uniform. In such embodiment, successive digitized samples of the color video signal are alternately separated into first and second blocks, as shown in FIG. 19, so that digitized samples having odd numbers $D_1$ to $D_{(2n-1)}$ are included in the first block and digitized samples having even numbers $D_2$ to $D_{2n}$ are included in the second block. Further, each block is divided into N/2 pluralities of successive ones of the digitized samples in each block, in which N is an even integer which is greater than or equal to $2(N \geq 2)$. The number N corresponds to the number of channels into which the digital video signal is separated. For example, a first plurality in the first block includes samples $D_1$ to $D_{(2i-1)}$ and a first plurality in the second block includes samples $D_2$ to $D_{2i}$.

As an example, in the case where the digitized video signal is separated into four channels, as shown in FIGS. 20–23, each of the first and second blocks is divided into two pluralities (N=4) of successive digitized samples of the respective blocks. In such case, if the total number of samples in the two blocks is equal to the number of samples of the effective video signal in one horizontal line, 2n=768. Accordingly, the first plurality of odd-numbered successive digitized samples $D_1$–$D_{383}$ in the first block is distributed to the first channel A by interface 14 so that 192 digitized samples are distributed to channel A from the first horizontal line. In like manner, odd-numbered digitized samples $D_{385}$–$D_{767}$ form the second plurality of successive digitized samples of the first block distributed to the second channel B. In the second block, even-numbered digitized samples $D_2$–$D_{384}$ are distributed to the third channel C and even-numbered digitized samples $D_{386}$–$D_{768}$ are distributed to the last channel D. Each of the pluralities is therefore comprised of the two sub-blocks (FIG. 23), each sub-block containing in order, a synchronizing signal (SYNC), identifying (ID) and address (AD) signals, effective video data, and a CRC code, as previously discussed.

When the digitized samples are recorded on tracks $T_A$–$T_D$ which correspond to channels A-D, respectively, the chrominance and luminance portions of the composite digital video signal can be separated by a fourth order digital filter circuit so that any erroneous phase of the color sub-carrier during reproduction in the high speed search mode can be corrected, as previously discussed. One embodiment of such fourth order digital filter circuit 300 is shown in FIG. 24 and has a luminance filter characteristic $Y = \frac{1}{4}(1 + 2Z^{-2} + Z^{-4})$ and a chrominance filter characteristic $C = \frac{1}{4}(-1 + 2Z^{-2} - Z^{-4})$, where Z is a one sample delay transfer characteristic of the one sample delay circuits of the filter circuit. In particular, digital filter 300 includes a series combination of four one sample delay circuits 302,304,306 and 308 supplied with the digitized samples. An adding circuit 310 receives the four sample delayed signal from delay circuit 308 at a negative input thereof, the two sample delayed signal from delay circuit 304 applied through a multiply-by-two circuit 312 at a positive input thereof, and the input sample at another negative input thereof. Adding circuit 310 sums these signals and supplies the added signal to a divide-by-four circuit 314 which produces the separated chrominance component. In like manner, an adding circuit 316 receives the four sample delayed signal from delay circuit 308 at a positive input thereof, the two sample delayed signal from delay circuit 304 applied through multiply-by-two circuit 312 at another positive input thereof, and the input sample at still another positive input thereof. Adding circuit 316 sums these signals and supplies the added signal to a divide-by-four circuit 318 which produces the separated luminance component. As was previously described in regard to FIG. 17 and the first embodiment, the chrominance component than has any phase errors in its color sub-carrier corrected.

It should be noted that, in the previously proposed digital VTR, a sampling frequency of $3f_{sc}$ has only been used. In other words, no known digital VTRs have used sampling frequencies of $4f_{sc}$. However, the fourth order digital filter circuit 300 used with the second embodiment of the invention can only be utilized with a sampling frequency of $4f_{sc}$ and does not operate properly when the sampling frequency is $3f_{sc}$.

Further, as in the first embodiment, during the normal reproducing mode, the concealment method illustrated in FIGS. 18A–18F can also be utilized when the digitized samples are recorded in the manner according to the second embodiment of this invention.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of recording a color video signal in a plurality of parallel tracks extending obliquely on a magnetic tape, said method comprising the steps of:
   sampling said color video signal at a frequency which is four times the color sub-carrier frequency of the color video signal;
   converting the sampled color video signal into digitized form;
   alternately separating consecutive ones of the digitized samples into a first odd block and a second even block; and
   recording respective groupings of successive digitized samples from said first odd block in alternate ones of said plurality of parallel tracks and respective groupings of successive digitized samples from said second even block in the remaining alternate ones of said plurality of parallel tracks.

2. A method of recording and reproducing a color video signal in a plurality of parallel tracks extending obliquely on a magnetic tape, said color video signal including a chrominance component and a luminance component, said method comprising the steps of:
   recording said color video signal in said plurality of parallel tracks, including the steps of:
   sampling said color video signal at a frequency which is at least three times the color sub-carrier frequency of the color video signal;
   converting the sampled color video signal into digitized form; and
   recording respective pluralities of contiguous ones of the digitized samples which are arranged in a predetermined sequence sequentially in said plurality of parallel tracks, with each plurality of contiguous ones of the digitized samples corresponding to at least one cycle of the color sub-carrier of said color video signal;
   reproducing said color video signal from said plurality of parallel tracks, including the step of:
   separating the chrominance component of the reproducing sampled digitized signal in each track by filter means having a chrominance filter characteristic $C=(1-Z^{-2})/2$, where Z is a delay transfer characteristic of the filter means.

3. The method according to claim 2; in which the step of reproducing said color video signal includes the step of correcting any error in the phase of the color subcarrier of the reproduced color video signal.

4. The method according to claim 3; in which said step of correcting any error includes the steps of comparing the phase of the color sub-carrier of the separated chrominance component with a reference phase and producing an output in response to such comparison, and correcting any error in the phase of the color sub-carrier of the separated chrominance component in response to said output.

5. A method of recording and reproducing a color video signal in a plurality of parallel tracks extending obliquely on a magnetic tape, said color video signal including a chrominance component and a luminance component, said method comprising the steps of:
   recording said color video signal in said plurality of parallel tracks, including the steps of:
   sampling said color video signal at a frequency which is four times the color sub-carrier frequency of the color video signal;
   converting the sampled color video signal into digitized form;
   alternately separating contiguous ones of the digitized samples into first and second blocks; and
   recording respective pluralities of successive digitized samples of said first and second blocks sequentially in said plurality of parallel tracks; and
   reproducing said color video signal from said plurality of parallel tracks, including the step of:
   separating the chrominance component of the reproduced sampled digitized signal in each track by filter means having a chrominance filter characteristic $C=\frac{1}{4}(-1+2Z^{-2}-Z^4)$, where Z is a delay transfer characteristic of the filter means.

6. Apparatus for recording a color video signal in a plurality of parallel tracks extending obliquely on a magnetic tape, comprising:
   means for sampling said color video signal at a frequency which is four times the color sub-carrier frequency of the color video signal and for converting the sampled color video signal into digitized form; and means for alternately separating consecutive ones of the digitized samples into a first odd block and a second even block and for recording respective groupings of successive digitized samples from said first odd block in alternate ones of said plurality of parallel tracks and respective groupings of successive digitized samples from said second even block in the remaining alternate ones of said plurality of parallel tracks.

7. Apparatus for recording and reproducing a color video signal in a plurality of parallel tracks extending obliquely on a magnetic tape, said color video signal including a chrominance component and a luminance component, said apparatus comprising:

a recording section for recording said color video signal in said plurality of parallel tracks, including:
means for sampling said color video signal at a frequency which is at least three times the color sub-carrier frequency of the color video signal and for converting the sampled color video signal into digital form; and
means for recording respective pluralities of the digitized samples which are arranged in a predetermined sequence sequentially in said plurality of parallel tracks, in which said digitized samples in each plurality of digitized samples are arranged in a contiguous manner, with each plurality of contiguous digitized samples corresponding to at least one cycle of the color sub-carrier of said color video signal; and
a reproducing section for reproducing said color video signal from said plurality of parallel tracks, including:
filter means for separating the chrominance component of the reproduced sampled digital signal in each track and having a delay transfer characteristic; in which said filter means has a chrominance filter characteristic $C=(1-Z^{-2})/2$, where Z is the delay transfer characteristic of the filter means.

8. Apparatus according to claim 7; in which said filter means includes an input receiving said contiguous digitized samples of each plurality from said plurality of tracks; sample delay means for delaying the contiguous samples from said input by a period of two samples; means for subtracting the contiguous samples at the input from said delayed contiguous samples from the sample delay means and producing an output therefrom; and dividing means for dividing said output by two so as to produce the separated chrominance component.

9. Apparatus according to claim 7; in which said reproducing section further includes phase correcting means for correcting any error in the phase of the color sub-carrier of the separated chrominance component.

10. Apparatus according to claim 9; in which said phase correcting means includes phase comparator means for comparing the phase of the color sub-carrier of the separated chrominance component with a reference phase and for producing an output in response thereto, and phase compensating means for correcting any error in the phase of the color sub-carrier of the separated chrominance component in response to the output from said phase comparator means.

11. Apparatus for recording and reproducing a color video signal in a plurality of parallel tracks extending obliquely on a magnetic tape, said color video signal including a chrominance component and a luminance component, said apparatus comprising:

a recording section for recording said color video signal in said plurality of parallel tracks, including:
means for sampling said color video signal at a frequency which is four times the color sub-carrier frequency of the color video signal and for converting the sampled color video signal into digital form; and
means for alternately separating contiguous ones of the digitized samples into first and second blocks and for recording respective pluralities of successive digitized samples of said first and second blocks sequentially in said plurality of parallel tracks; and
a reproducing section for reproducing said color video signal from said plurality of parallel tracks, including:
filter means for separating the chrominance component of the reproduced sampled digital signal in each track and having a chrominance filter characteristic $C=\frac{1}{4}(-1+2Z^{-2}-Z^{-4})$, where Z is a delay transfer characteristic of the filter means.

12. Apparatus according to claim 11; in which said filter means includes an input receiving said contiguous digitized samples of said plurality from said plurality of tracks; first sample delay means for delaying the contiguous samples from said input by a period of two samples; second sample delay means for further delaying by a period of two samples the delayed contiguous samples from said first sample delay means; multiplier means for multiplying the delayed contiguous samples from said first sample delay means by two; means for subtracting the contiguous samples from said input and the delayed samples from said second sample delay means from the delayed samples from said multiplier means; and dividing means for dividing the output of the means for subtracting by four to produce the separated chrominance component.

* * * * *